US 12,385,849 B2

(12) United States Patent
Terahai et al.

(10) Patent No.: US 12,385,849 B2
(45) Date of Patent: Aug. 12, 2025

(54) INSPECTION METHOD AND INSPECTION SYSTEM FOR PILLAR-SHAPED HONEYCOMB STRUCTURE MADE OF CERAMIC (71) Applicant: NGK INSULATORS, LTD., Nagoya (JP)

(72) Inventors: Takafumi Terahai, Nagoya (JP); Ryota Kurahashi, Nagoya (JP); Yoshihiro Sato, Nisshin (JP)

(73) Assignee: NGK INSULATORS, LTD., Nagoya (JP)

(*) Notice: Subject to any disclaimer, the term of this patent is extended or adjusted under 35 U.S.C. 154(b) by 0 days.

(21) Appl. No.: 18/477,793

(22) Filed: Sep. 29, 2023

(65) Prior Publication Data
US 2024/0020820 A1 Jan. 18, 2024

Related U.S. Application Data (63) Continuation of application No. 17/177,351, filed on Feb. 17, 2021, now Pat. No. 11,915,409.

(30) Foreign Application Priority Data

Mar. 31, 2020 (JP) .................. 2020-064970

(51) Int. Cl.
G06T 7/66 (2017.01)
B25J 15/00 (2006.01)
(Continued)

(52) U.S. Cl.
CPC ......... G06T 7/0008 (2013.01); B25J 15/0004 (2013.01); G01B 21/02 (2013.01);
(Continued)

(58) Field of Classification Search
CPC ... G06T 7/0008; G06T 7/0004; G06T 7/0006; G06T 7/66; G06T 2207/30148;
(Continued)

(56) References Cited

U.S. PATENT DOCUMENTS 4,504,771 A * 3/1985 Inaba ................... G05B 19/416
318/561
6,667,800 B1 12/2003 Larsson et al.
(Continued)

FOREIGN PATENT DOCUMENTS

AU 2021239037 A1 12/2021
CN 101023447 A 8/2007
(Continued)

OTHER PUBLICATIONS

Chinese Office Action (with English translation) dated Nov. 13, 2023 (Application No. 202110191020.1).
(Continued)

Primary Examiner — Fabio S Lima
(74) Attorney, Agent, or Firm — BURR PATENT LAW, PLLC (57) ABSTRACT An inspection system for carrying out an inspection method for a pillar-shaped honeycomb structure, the inspection system including: a robot arm with a robot hand at a tip of the robot arm, the robot hand comprising a pair of gripping surfaces capable of gripping the pillar-shaped honeycomb structure from the first end surface and the second end surface, the pair of gripping surfaces being configured to be able to rotate the pillar-shaped honeycomb structure at a predetermined rotational speed while gripping the pillar-shaped honeycomb structure from the first end surface and the second end surface; the area camera for the side surface; a screen that can display the strip-shaped images; and a controller that can at least set a rotation speed of the pair of (Continued)

gripping surfaces and the shutter speed of the area camera for the side surface.

6 Claims, 6 Drawing Sheets

(51) Int. Cl.
    *G01B 21/02*     (2006.01)
    *G06T 7/00*     (2017.01)
    *H04N 3/14*     (2006.01)
    *H04N 23/72*     (2023.01)
    *H04N 25/40*     (2023.01)

(52) U.S. Cl.
    CPC .......... *G06T 7/0004* (2013.01); *G06T 7/0006* (2013.01); *G06T 7/66* (2017.01); *H04N 3/155* (2013.01); *H04N 23/72* (2023.01); *H04N 25/40* (2023.01); *G05B 2219/39478* (2013.01); *G06T 2207/30148* (2013.01); *G06T 2207/30164* (2013.01)

(58) Field of Classification Search
    CPC .......... G06T 2207/30164; G01B 21/02; H04N 3/155; H04N 23/72
    See application file for complete search history.

(56) References Cited

U.S. PATENT DOCUMENTS

| | | | |
|---|---|---|---|
| 8,090,143 | B2 | 1/2012 | Komaki et al. |
| 9,996,766 | B2 | 6/2018 | Richard et al. |
| 10,360,531 | B1* | 7/2019 | Stallman ............... G06Q 10/087 |
| 10,744,675 | B2 | 8/2020 | Citriniti et al. |
| 2005/0275833 | A1 | 12/2005 | Silver |
| 2006/0078193 | A1 | 4/2006 | Brummel et al. |
| 2006/0151926 | A1 | 7/2006 | Zoeller, II |
| 2008/0140248 | A1 | 6/2008 | Moore |
| 2009/0010523 | A1 | 1/2009 | Komaki et al. |
| 2010/0119146 | A1* | 5/2010 | Inazumi ............... G06T 5/73 901/1 |
| 2010/0192523 | A1 | 8/2010 | Stoeckel et al. |
| 2011/0116704 | A1 | 5/2011 | Zoeller, III |
| 2011/0128370 | A1 | 6/2011 | Booth et al. |
| 2017/0124704 | A1 | 5/2017 | Wu et al. |
| 2017/0365050 | A1* | 12/2017 | Kurahashi ............ G06T 7/0004 |
| 2018/0257241 | A1* | 9/2018 | Claretti ................ B25J 15/0028 |
| 2019/0039246 | A1* | 2/2019 | Kokubo ................ B25J 9/1692 |
| 2019/0139249 | A1 | 5/2019 | Nishida et al. |
| 2019/0265172 | A1 | 8/2019 | Koseki et al. |
| 2020/0189106 | A1* | 6/2020 | Tsuchiya ............ B25J 19/026 |
| 2021/0018446 | A1 | 1/2021 | Terahai et al. |
| 2021/0255114 | A1 | 8/2021 | Li et al. |
| 2021/0302296 | A1 | 9/2021 | Sato et al. |
| 2022/0009092 | A1* | 1/2022 | Watanabe ............. G06V 20/10 |
| 2023/0064861 | A1* | 3/2023 | Sung .................... H01L 21/681 |
| 2023/0071384 | A1* | 3/2023 | Agarwal ............... B25J 19/023 |
| 2023/0121334 | A1* | 4/2023 | Haven .................. B25J 9/1697 382/103 |
| 2023/0333518 | A1* | 10/2023 | Oi ......................... B25J 9/163 |

FOREIGN PATENT DOCUMENTS

| | | |
|---|---|---|
| CN | 109923402 A | 6/2019 |
| CN | 109967379 A | 7/2019 |
| CN | 110389558 A | 10/2019 |
| CN | 112019709 A | 12/2020 |
| CN | 110570408 B | 4/2022 |
| DE | 698 33 103 T2 | 8/2006 |
| DE | 10 2015 001 219 A1 | 8/2015 |
| DE | 11 2016 001 723 T5 | 1/2018 |
| DE | 10 2018 008 277 A1 | 5/2019 |
| EP | 3 832 532 A2 | 6/2021 |
| FI | 127055 B | 10/2017 |
| JP | 2003-161619 A | 6/2003 |
| JP | 2007-132753 A | 5/2007 |
| JP | 3928222 B2 | 6/2007 |
| JP | 2015-025741 A | 2/2015 |
| JP | 2016-080517 A | 5/2016 |
| JP | 2018-072252 A | 5/2018 |
| KR | 2007-0040786 A | 4/2007 |
| KR | 2008-0036145 A | 4/2008 |
| KR | 2014-0084612 A | 7/2014 |
| WO | 2017/061318 A1 | 4/2017 |
| WO | 2018/088552 A1 | 5/2018 |
| WO | 2021/040986 A1 | 3/2021 |
| WO | 2021/087029 A1 | 5/2021 |

OTHER PUBLICATIONS

Japanese Office Action (Application No. 2020-064970) dated Aug. 23, 2022 (with English translation).

S. Luan, L. Wang, W. Zhou and F. Yao, "Locate Hazelnut Axis Based on Projection Gradient Statistics," 2019 IEEE 14th International Conference on Intelligent Systems and Knowledge Engineering (ISKE), 2019, pp. 437-442, doi: 10.1109/ISKE47853.2019.9170352. (Year: 2019).

C. Carbonara, J. Defilippis and M. Korpi, "High Frame Rate Capture and Production," SMPTE 2015 Annual Technical Conference and Exhibition, 2015, pp. 1-19, doi: 10.5594/M001625. (Year: 2015).

German Office Action (with English translation) dated Feb. 5, 2025 (Application No. 10 2021 000 808.1).

\* cited by examiner

FIG. 1

Exhaust gas

INSPECTION METHOD AND INSPECTION SYSTEM FOR PILLAR-SHAPED HONEYCOMB STRUCTURE MADE OF CERAMIC

CROSS REFERENCE TO RELATED APPLICATION

This application is a continuation of U.S. application Ser. No. 17/177,351 filed Feb. 17, 2021, the entirety of which is incorporated herein by reference.

FIELD OF THE INVENTION

The present invention relates to an inspection method and an inspection system for a pillar-shaped honeycomb structure made of ceramic.

BACKGROUND OF THE INVENTION

Pillar-shaped honeycomb structures made of ceramic, which are excellent in heat resistance, thermal shock resistance, and oxidation resistance, have been widely used as a filter for collecting particulate matter contained in exhaust gas from an internal combustion engine, a boiler, etc. and as a catalyst carrier for exhaust gas purification catalysts.

Generally, a pillar-shaped honeycomb structure made of ceramic comprises a side surface, and a plurality of partition walls disposed on the inner peripheral side of the side surface, the partition walls partitioning a plurality of cells extending in the height direction from a first end surface to a second end surface. A pillar-shaped honeycomb structure made of ceramic can be manufactured, for example, through a step of kneading a powder of ceramic raw material as the constituent material with an organic binder and water, etc. to obtain a clay-like green boy and forming the green body into a pillar-shaped honeycomb formed body with an extrusion molding method, and a step of firing the pillar-shaped honeycomb formed body.

After firing, defects such as cracks or foreign substances adhering to the side surface of the pillar-shaped honeycomb structure may occur. The occurrence of cracks and the adhesion of foreign substances may lead to a decrease in the strength of the pillar-shaped honeycomb structure, a decrease in filtration performance when the pillar-shaped honeycomb structure is used as a filter, and a decrease in exhaust gas purification performance when it is used as a catalyst carrier. Therefore, it is necessary to inspect the presence or absence of defects on the side surface of the pillar-shaped honeycomb structure.

As a method for inspecting the side surface of a pillar-shaped honeycomb structure, there is known a method of inspecting the presence or absence of defects by capturing the side surface with a line sensor camera while rotating the pillar-shaped honeycomb structure. Patent Literature 1 (WO 2017/061318) discloses a method for surface inspection that can determine the presence or absence of cracks formed on the side surface of the honeycomb structure with a simple method comprising imaging with two illumination lights with different irradiation directions and wavelength bands, and comparing two images for determination which are generated based on the imaging result.

CITATION LIST

Patent Literature

[Patent Literature 1] WO 2017/061318

SUMMARY OF THE INVENTION

According to Patent Literature 1, by imaging the side surface of a honeycomb structure using two illumination lights with different irradiation directions and wavelength bands, and comparing the two images for determination which are generated based on the imaging result, it is possible to distinguish between cracks and swells (surface undulations) that do not cause quality problems, and prevent excessive detection.

If the shape of a pillar-shaped honeycomb structure is cylindrical, by rotating the pillar-shaped honeycomb structure about its central axis as a rotation axis, it is possible to perform while keeping the distance from the camera constant. However, some pillar-shaped honeycomb structures have a shape other than a cylindrical shape. When such a pillar-shaped honeycomb structure is rotated about its central axis as a rotation axis, the distance between the camera and the pillar-shaped honeycomb structure fluctuates, and a corresponding study is necessary. Patent Literature 1 does not fully study a method for inspecting a pillar-shaped honeycomb structure having a shape other than a cylindrical shape.

The present invention has been made in view of the above circumstances, and in one embodiment, an object is to provide an inspection method for a pillar-shaped honeycomb structure made of ceramic, which can be suitably used not only for a cylindrical shape but also for a shape other than a cylindrical shape. Further, in another embodiment, an object is to provide an inspection system suitable for carrying out such an inspection method.

When observing a pillar-shaped honeycomb structure made of ceramic having a shape other than a cylindrical shape from the end surface side, the distance from the center of gravity of the end surface to the outer peripheral side surface fluctuates. Therefore, when the side surface of the pillar-shaped honeycomb structure is captured with a fixed camera while rotating the pillar-shaped honeycomb structure as taught in Patent Literature 1, since the distance between the camera and the pillar-shaped honeycomb structure fluctuates, the camera cannot keep in focus. Therefore, in order to keep the distance (working distance) between the camera and the pillar-shaped honeycomb structure constant, it is necessary to perform capturing while moving one or both of the camera and the pillar-shaped honeycomb structure. However, when the speed of inspection becomes higher, the captured image will be blurred due to vibration or the like during movement.

In this regard, the present inventors have considered suppressing blurring by shortening the exposure time. However, it has been found that even if the exposure time is short, in other words, the shutter speed is increased, the line sensor camera as taught in Patent Literature 1 cannot sufficiently suppress image blurring. Accordingly, as a result of further consideration by the present inventors, it has been found that when an area camera is used like a line sensor camera such that a strip-shaped imaging range is repeatedly captured while releasing the shutter at a high speed, an image with suppressed blur can be obtained. The present invention has been completed based on the above findings, and is exemplified as below.

[1]

An inspection method for a pillar-shaped honeycomb structure, comprising:

a step of preparing a pillar-shaped honeycomb structure made of ceramic, which comprises a first end surface, a second end surface, and a side surface;

a step A of generating a plurality of strip-shaped images by repeatedly capturing the side surface part by part with an area camera for the side surface while relatively moving the area camera for the side surface with respect to the pillar-shaped honeycomb structure so that the area camera for the side surface orbits the side surface of the pillar-shaped honeycomb structure; and a step B of determining presence or absence of defects on the side surface based on the strip-shaped images obtained in the step A;

wherein a number of the strip-shaped images generated in the step A is sufficient to cover the entire side surface;

a shutter speed when the area camera for the side surface captures a part of the side surface for generating a single strip-shaped image is 10 to 1000 μsec; and each of the strip-shaped images has a length covering the entire height of the pillar-shaped honeycomb structure in a longitudinal direction, and a length of 1 to 10 mm in a width direction.

[2]

The inspection method for a pillar-shaped honeycomb structure according to [1], wherein an average peripheral speed when the area camera for the side surface orbits the side surface of the pillar-shaped honeycomb structure is 50 to 300 mm/sec.

[3]

The inspection method for a pillar-shaped honeycomb structure according to [1] or [2], wherein a frame rate when the side surface is repeatedly captured part by part with the area camera for the side surface is 100 to 300 Hz.

[4]

The inspection method for a pillar-shaped honeycomb structure according to any one of [1] to [3], wherein in the step A, the area camera for the side surface alternately generates the strip-shaped images with different light irradiation directions by repeatedly and stroboscopically capturing the side surface part by part with the area camera for the side surface while alternately irradiating the side surface with a first light and a second light from different directions interposing the area camera for the side surface.

[5]

The inspection method for a pillar-shaped honeycomb structure according to any one of [1] to [4], wherein the area camera for the side surface is a monochrome area camera.

[6]

The inspection method for a pillar-shaped honeycomb structure according to any one of [1] to [5], wherein a pixel resolution of the area camera for the side surface is 50 μm/pix or less.

[7]

The inspection method for a pillar-shaped honeycomb structure according to any one of [1] to [6], wherein the first end surface and the second end surface of the pillar-shaped honeycomb structure have a round shape.

[8]

The inspection method for a pillar-shaped honeycomb structure according to any one of [1] to [7], wherein in the step A, when the area camera for the side surface orbits the side surface of the pillar-shaped honeycomb structure, the area camera for the side surface is relatively moved with respect to the pillar-shaped honeycomb structure so that a change in an imaging distance between the side surface and the area camera for the side surface is within ±2 mm.

[9]

The inspection method for a pillar-shaped honeycomb structure according to any one of [1] to [8], comprising a step of measuring a position of a center of gravity of the first end surface and a position of a center of gravity of the second end surface and adjusting inclination of the pillar-shaped honeycomb structure before carrying out the step A so that a straight line connecting the position of the center of gravity of the first end surface and the position of the center of gravity of the second end surface approaches perpendicular to a capturing direction of the area camera for the side surface.

[10]

The inspection method for a pillar-shaped honeycomb structure according to any one of [1] to [9], wherein the capturing in the step A is carried out so that each of the strip-shaped images has a portion overlapping by 3 mm or more in a peripheral direction of the side surface of the pillar-shaped honeycomb structure with the strip-shaped image of the same light irradiation direction at a previous capturing time and with the strip-shaped image of the same light irradiation direction at a next capturing time.

[11]

An inspection system for carrying out the inspection method for a pillar-shaped honeycomb structure according to any one of [1] to [10], comprising:

a robot arm with a robot hand at a tip of the robot arm, the robot hand comprising a pair of gripping surfaces capable of gripping the pillar-shaped honeycomb structure from the first end surface and the second end surface, the pair of gripping surfaces configured to be able to rotate the pillar-shaped honeycomb structure at a predetermined rotational speed while gripping the pillar-shaped honeycomb structure from the first end surface and the second end surface;

the area camera for the side surface;

a screen that can display the strip-shaped images; and a controller that can at least set a rotation speed of the pair of gripping surfaces and the shutter speed of the area camera for the side surface.

[12]

The inspection system according to [11], comprising a first light irradiator for irradiating the side surface with the first light and a second light irradiator for irradiating the side surface with the second light from a direction different from the first light with the area camera for the side surface interposed therebetween.

[13]

The inspection system according to or [12], comprising a displacement meter for measuring the imaging distance between the side surface and the area camera for the side surface, wherein the displacement meter is configured to be able to monitor an amount of change in the distance while the area camera for the side surface orbits the side surface of the pillar-shaped honeycomb structure in the step A.

[14]

The inspection system according to any one of to [13], further comprising an area camera for the first end surface for capturing the first end surface, and an area camera for the second end surface for capturing the second end surface which is arranged at a position opposite to the area camera for the first end surface, wherein the inspection system is configured to be able to measure a position of a center of gravity of the first end surface and a position of a center of gravity of the second end surface based on an image of the first end surface captured with the area camera for the first end surface and an image of the second end surface captured with the area camera for the second end surface, and to correct a posture of the robot arm in a state where the robot hand is gripping the pillar-shaped honeycomb structure so that the straight line connecting the position of the center of gravity of the first end surface and the position of the center of gravity of the second end surface approaches perpendicular to the capturing direction of the area camera for the side surface.

[15]

The inspection system according to any one of to [14], further comprising an area camera for the first end surface for capturing the first end surface,
  wherein the inspection system is configured to be able to measure a positional deviation in an X-axis direction and a Y-axis direction on tool coordinates between a center of gravity of the first end surface and a rotation axis of the gripping surface on a side of the first end surface based on a position of the center of gravity of the first end surface specified by an image of the first end surface captured by the area camera for the first end surface and a position of the rotation axis of the gripping surface on the side of the first end surface, and to correct a tool coordinate center in the X-axis direction and the Y-axis direction by an amount of the positional deviation with the robot arm based on a measurement result in a state where the robot hand is gripping the pillar-shaped honeycomb structure.

[16]

The inspection system according to any one of to [15], further comprising an area camera for the first end surface for capturing the first end surface,
  wherein the inspection system is configured to be able to measure a deviation of a Z-axis rotation angle on tool coordinates from a target inspection position of the pillar-shaped honeycomb structure based an image of the first end surface captured by the area camera for the first end surface, and to rotate the pillar-shaped honeycomb structure by an amount of the deviation of the angle on the Z-axis with the robot arm based on a measurement result in a state where the robot hand is gripping the pillar-shaped honeycomb structure.

According to one embodiment of the present invention, there is provided an inspection method for a pillar-shaped honeycomb structure made of ceramic, which can be suitably used not only for a cylindrical shape but also for a shape other than a cylindrical shape. This inspection method contributes to a quick inspection of the presence or absence of defects on the side surface of the pillar-shaped honeycomb structure regardless of the shape of the end surface of the pillar-shaped honeycomb structure.

DETAILED DESCRIPTION OF THE INVENTION

Hereinafter, embodiments of the present invention will be described in detail with reference to the drawings. It should be understood that the present invention is not limited to the following embodiments, and any change, improvement or the like of the design may be appropriately added based on ordinary knowledge of those skilled in the art without departing from the spirit of the present invention.

(1. Pillar-Shaped Honeycomb Structure)

In one embodiment, the inspection target of the inspection method according to the present invention is a pillar-shaped honeycomb structure made of ceramic, which comprises a first end surface, a second end surface, and a side surface. As the ceramic constituting the pillar-shaped honeycomb structure, though not limited to, but preferably, ceramic comprising at least one selected from the group consisting of cordierite, mullite, zircon, aluminum titanate, silicon carbide, silicon-silicon carbide composite, silicon nitride, zirconia, spinel, indialite, sapphirine, corundum, and titania may be mentioned for example. In addition, for these ceramics, one type may be contained alone, or two or more types may be contained at the same time.

Figure 1:
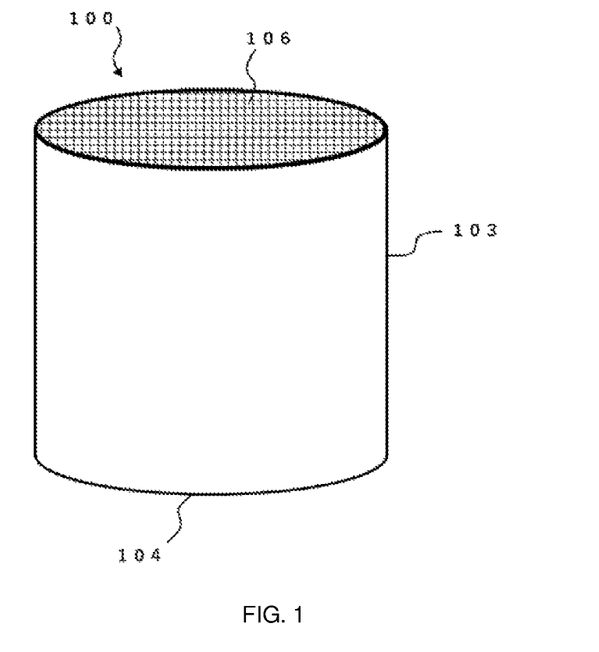
FIG. 1 is a perspective view schematically showing a wall-through type pillar-shaped honeycomb structure.
Figure 2:
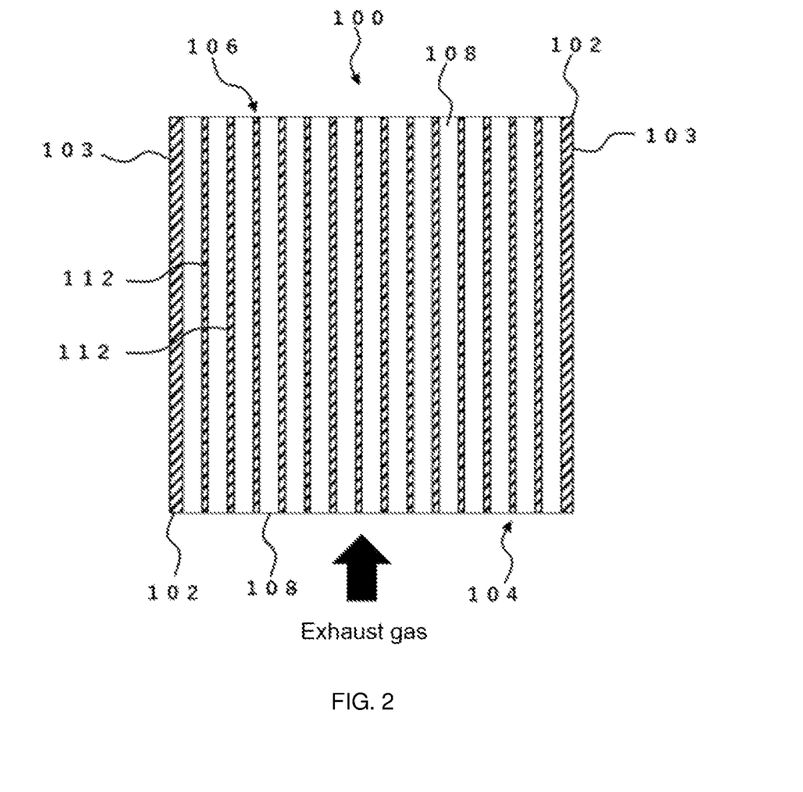
FIG. 2 is a schematic cross-sectional view of a wall-through type pillar-shaped honeycomb structure observed in a cross-section parallel to the direction in which the cells extend.

FIGS. 1 and 2 illustrate a schematic perspective view and a cross-sectional view of a pillar-shaped honeycomb structure (100) that can be used as a wall through type exhaust gas filter and/or catalyst carrier for automobiles, respectively. The pillar-shaped honeycomb structure (100) comprises an outer peripheral side wall (102), and partition walls (112) disposed on an inner peripheral side of the outer peripheral side wall (102), the partition walls (112) partitioning a plurality of cells (108) forming flow paths for fluid from a first end surface (104) to a second end surface (106). The outer surface of the outer peripheral side wall (102) forms the side surface (103) of the pillar-shaped honeycomb structure (100). In this pillar-shaped honeycomb structure (100), both ends of each cell (108) are open, and an exhaust gas flowing into each cell (108) from the first end surface (104) is purified while passing through the cell, and flows out of the second end surface (106). Here, the first end surface (104) is on the upstream side of the exhaust gas and the second end surface (106) is on the downstream side of the exhaust gas, but this difference between the first end surface and the second end surface is for the sake of convenience, and the second end surface (106) may be on the upstream side of the exhaust gas, and the first end surface (104) may be on the downstream side of the exhaust gas.

Figure 3:
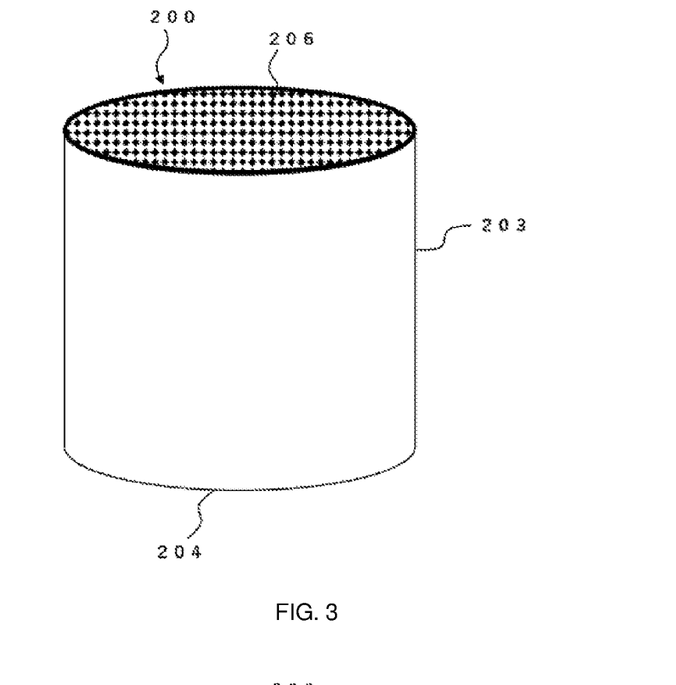
FIG. 3 is a perspective view schematically showing a wall-flow type pillar-shaped honeycomb structure.
Figure 4:
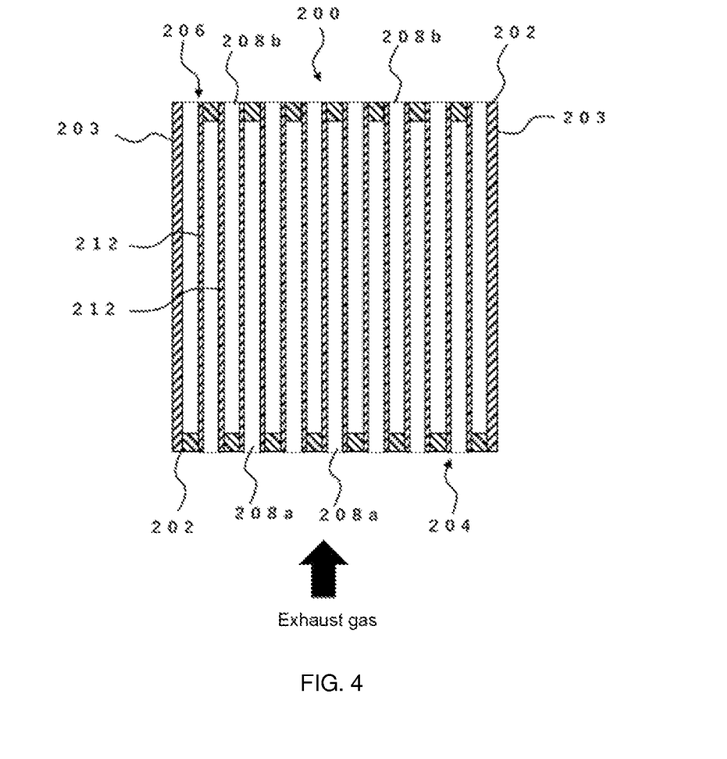
FIG. 4 is a schematic cross-sectional view of a wall-flow type pillar-shaped honeycomb structure observed in a cross-section parallel to the direction in which the cells extend.

FIGS. 3 and 4 illustrate a schematic perspective view and a cross-sectional view of a pillar-shaped honeycomb structure (200) that can be used as a wall-flow type exhaust gas filter and/or catalyst carrier for automobiles, respectively. The pillar-shaped honeycomb structure (200) comprises an outer peripheral side wall (202) and partition walls (212) disposed on an inner peripheral side of the outer peripheral side wall (202), the partition walls (212) partitioning a plurality of cells (208a, 208b) forming flow paths for fluid from a first end surface (204) to a second end surface (206). The outer surface of the outer peripheral side wall (202) forms the side surface (203) of the pillar-shaped honeycomb structure (200).

In the pillar-shaped honeycomb structure (200), the plurality of cells (208a, 208b) can be classified into a plurality of first cells (208a) extending from the first end surface (204) to the second end surface (206), opening on the first end surface (204) and being sealed on the second end surface (206), and a plurality of second cells (208b) disposed on the inner peripheral side from the outer peripheral side wall (202), extending from the first end surface (204) to the second end surface (206), being sealed on the first end surface (204) and opening on the second end surface (206). Further, in this pillar-shaped honeycomb structure (200), the first cells (208a) and the second cells (208b) are alternately arranged adjacent to each other with the partition walls (212) interposed therebetween.

When an exhaust gas containing particulate matter such as soot is supplied to the first end surface (204) on the upstream side of the pillar-shaped honeycomb structure (200), the exhaust gas is introduced into the first cells (208a) and proceeds downstream in the first cells (208a). Because the first cells (208a) are sealed on the second end surface (206) on the downstream side, the exhaust gas passes through the porous partition walls (212) that partition the first cells (208a) and the second cells (208b) and flows into the second cells (208b). Since particulate matter cannot pass through the partition walls (212), it is collected and deposited in the first cells (208a). After the particulate matter is removed, the cleaned exhaust gas that has flowed into the second cells (208b) proceeds downstream in the second cells (208b) and flows out of the second end surface (206) on the downstream side. Here, the first end surface (204) is on the upstream side of the exhaust gas and the second end surface (206) is on the downstream side of the exhaust gas, but this difference between the first end surface and the second end surface is for the sake of convenience, and the second end surface (206) may be on the upstream side of the exhaust gas, and the first end surface (204) may be on the downstream side of the exhaust gas.

The shape of each end surface of the pillar-shaped honeycomb structure is not particularly limited, but for example, an end surface shape whose outer peripheral contour is composed of a simple closed curve can be used. Typical examples of such an end surface shape include a round shape such as a circular shape, a long-circular shape, an elliptical shape, an oval shape, and a shape composed of a plurality of different arc components. The round shape refers to a shape composed of simple closed convex curves having no inwardly recessed outer peripheral contour among the simple closed curves. According to the inspection method of the present invention, a pillar-shaped honeycomb structure having end surfaces with not only a circular shape, but also a shape other than a circular shape, that is, a shape in which the length of a line segment extending from the center of gravity of the end surface to the outer peripheral contour varies can be suitably inspected, which is advantageous. The area of each end surface of the pillar-shaped honeycomb structure is not particularly limited, but can be, for example, 1900 to 97000 mm$^2$, and typically 6400 to 32000 mm$^2$. In addition, a circular shape means that the design shape is a circular shape, and a shape other than a circular shape means that the design shape is a shape other than a circular shape. This is because it is practically difficult to make a mathematically exact circle because dimensional errors are industrially unavoidable.

The shape of the cells in the cross-section perpendicular to the flow path direction of the cells is not limited, but is preferably a quadrangle, a hexagon, an octagon, or a combination thereof. Among these, square and hexagon are preferred. By making the cell shape in this way, the pressure loss when fluid passes through the pillar-shaped honeycomb structure is reduced, and the purification performance of catalyst becomes excellent.

The cell density (number of cells per unit cross-sectional area) is also not particularly limited, but for example, it can be 6 to 2000 cells/square inch (0.9 to 311 cells/cm$^2$). Here, the cell density is calculated by dividing the number of cells on one of the end surfaces (including the sealed cells) by the area of the one of the end surfaces excluding the outer peripheral side wall.

The thickness of the partition walls is also not particularly limited, but may be, for example, 50 μm to 330 μm.

The height of the pillar-shaped honeycomb structure (the length from the first end surface to the second end surface) is also not particularly limited, but may be, for example, 40 mm to 300 mm.

The pillar-shaped honeycomb structure can be manufactured by a known manufacturing method, but will be described below as an example. First, a raw material composition containing a ceramic raw material, a dispersion medium, a pore-former and a binder is kneaded to form a green body. Then, by extrusion molding of the green body, a desired pillar-shaped honeycomb formed body is prepared. After that, a pillar-shaped honeycomb structure is prepared by drying, degreasing, and firing the pillar-shaped honeycomb formed body. If sealing portions are to be formed, after the pillar-shaped honeycomb formed body is dried, predetermined sealing portions are formed on both end surfaces of the pillar-shaped honeycomb formed body and then dried. After that, a pillar-shaped honeycomb structure is prepared by degreasing and firing the pillar-shaped honeycomb formed body having sealing portions.

The use of the pillar-shaped honeycomb structure is not particularly limited. But for example, it is used in various industrial applications such as heat sinks, filters (for example, GPF, DPF), catalyst carriers, sliding parts, nozzles, heat exchangers, electrical insulation members and parts for semiconductor manufacturing devices.

(2. Inspection Method and Inspection System)

According to one embodiment of the present invention, there is provided an inspection method for a pillar-shaped honeycomb structure made of ceramic comprising a first end surface, a second end surface, and a side surface. Further, according to one embodiment of the present invention, there is provided an inspection system suitable for carrying out the inspection method.

2-1. Overview of Inspection System

Figure 5:
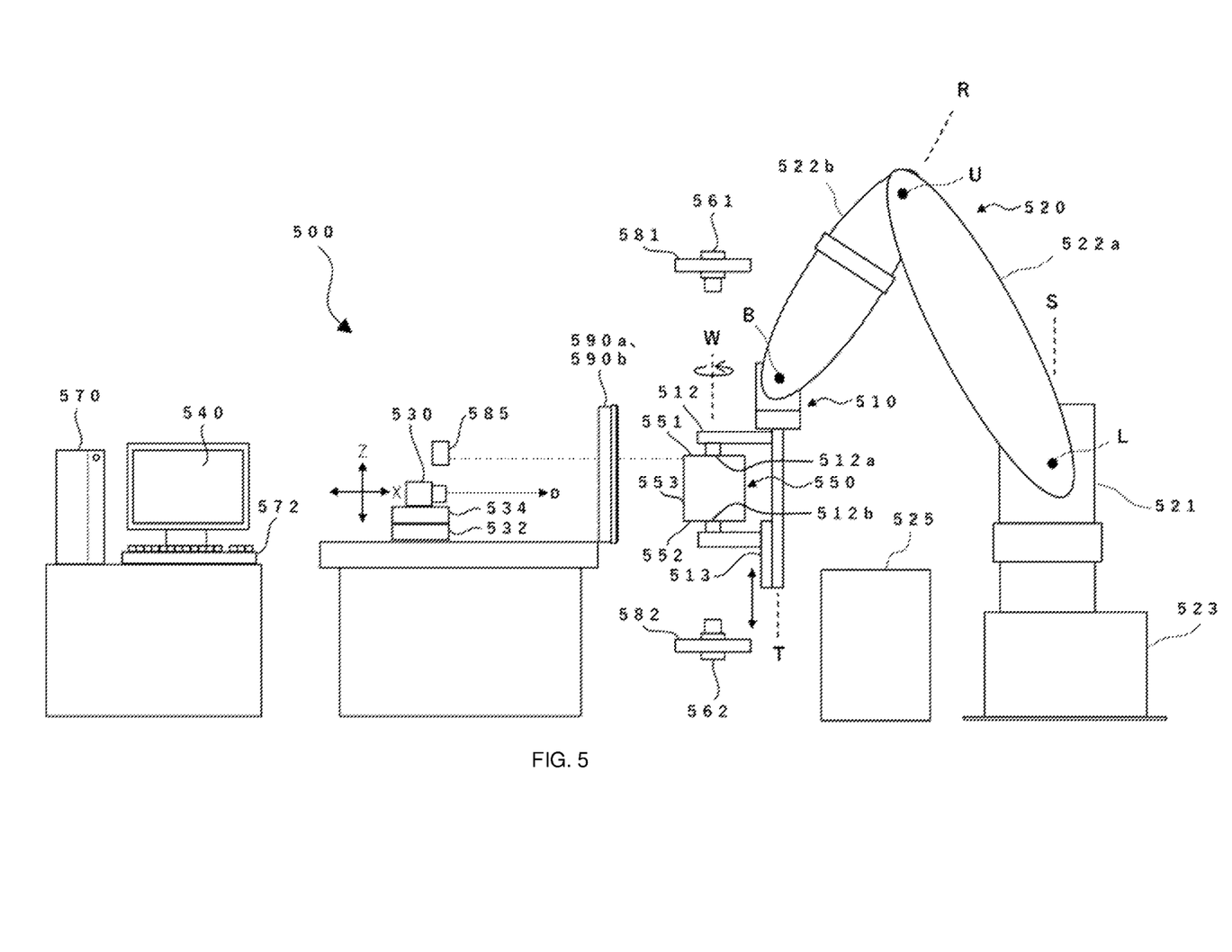
FIG. 5 is a schematic side view for illustrating a configuration of an inspection system according to one embodiment of the present invention.

FIG. 5 shows a schematic side view for illustrating the configuration of an inspection system (500) suitable for carrying out the inspection method according to one embodiment of the present invention. In one embodiment, the inspection system (500) comprises a robot arm (520) with a robot hand (510) at a tip of the robot arm (520), the robot hand (510) comprising a pair of gripping surfaces (512a, 512b) capable of gripping the pillar-shaped honeycomb structure (550) from the first end surface (551) and the second end surface (552), the pair of gripping surfaces (512a, 512b) being configured to be able to rotate the pillar-shaped honeycomb structure (550) at a predetermined rotational speed while gripping the pillar-shaped honeycomb structure from the first end surface (551) and the second end surface (552);

an area camera for the side surface (530) for capturing the side surface (553) of the pillar-shaped honeycomb structure (550);

a screen (540) that can display images generated as a result of capturing with the area camera for the side surface (530); and a controller (570) that can at least set a rotation speed of the pair of gripping surfaces (512a, 512b) and the shutter speed of the area camera for the side surface (530).

As the robot arm (520), an industrial robot such as a 6-axis vertical articulated robot or a 7-axis vertical articulated robot can be preferably used. In one embodiment, the robot arm (520) may comprise a pedestal (523); a base (521) provided on the pedestal (523) and rotatable about a first rotation axis S that extends in the vertical direction; a lower arm (522a) provided on the base (521) and rotatable about a second rotation axis L that extends in the horizontal direction; an upper arm (522b) provided at the tip of the lower arm (522a) and rotatable about a third rotation axis U that extends in the horizontal direction; and a robot hand (510) provided on the tip side of the upper arm (522b) and rotatable about a fourth rotation axis B that extends in the horizontal direction.

The upper arm (522b) may be configured to be rotatable about a fifth rotation axis R extending in the longitudinal direction of the upper arm (522b). The robot hand (510) may be configured to be rotatable about a sixth rotation axis T extending in a direction perpendicular to the pair of gripping surfaces (512a, 512b).

The robot hand (510) may have a chuck (512) for gripping the pillar-shaped honeycomb structure (550). The chuck (512) comprises the pair of gripping surfaces (512a, 512b), and is configured so that the pillar-shaped honeycomb structure (550) can be gripped from the first end surface (551) and the second end surface (552). The chuck (512) can have a linear motion mechanism (513) for controlling the distance between the pair of gripping surfaces (512a, 512b). Examples of the linear motion mechanism (513) include an electric cylinder.

The pair of gripping surfaces (512a, 512b) may be configured to be rotatable about a seventh rotation axis W extending in a direction perpendicular to the pair of gripping surfaces (512a, 512b). The pair of gripping surfaces (512a, 512b) are configured to be rotatable at a predetermined rotational speed by a driving means such as a servomotor. The servomotor may be equipped with an encoder for detecting a displacement amount such as a rotation angle of a pair of gripping surfaces (512a, 512b). The pair of gripping surfaces (512a, 512b) are preferably smaller than the size of the end surfaces (551, 552) of the pillar-shaped honeycomb structure (550). This is to prevent the figures of the pair of gripping surfaces (512a, 512b) from being imaged when capturing with the camera (530).

The base (521), the lower arm (522a), the upper arm (522b), and the robot hand (510) may each be configured to be driven by an actuator such as a servomotor. Further, the base (521), the lower arm (522a), the upper arm (522b), and the robot hand (510) may each be provided with a reduction gear, an encoder, and a transmission.

Figure 6:
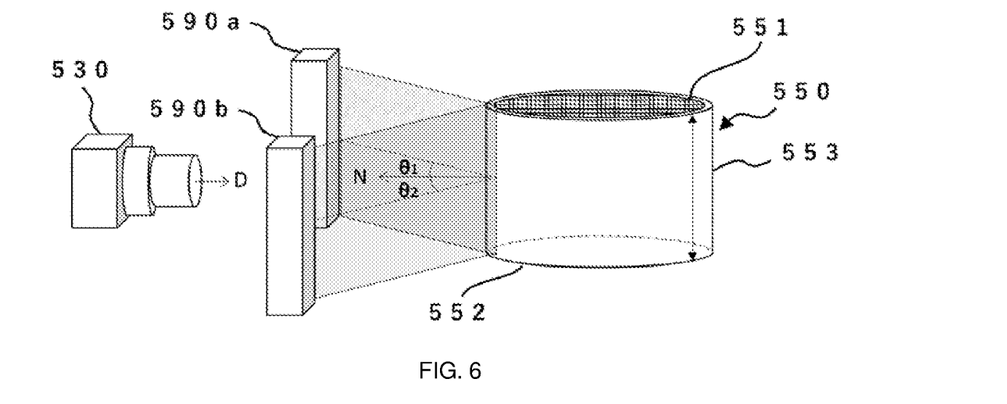
FIG. 6 is a schematic view for illustrating the positional relationship among an area camera for the side surface, a pillar-shaped honeycomb structure, a first light irradiator, and a second light irradiator in the inspection system according to one embodiment of the present invention.

In one embodiment, the inspection system (500) may comprise a first light irradiator (590a) for irradiating the side surface (553) of the pillar-shaped honeycomb structure (550) with a first light and a second light irradiator (590b) for irradiating the side surface (553) with a second light from a direction different from the first light with the area camera for the side surface (530) interposed therebetween. FIG. 6 is a schematic view for illustrating the positional relationship among the area camera for the side surface (530), the pillar-shaped honeycomb structure (550), the first light irradiator (590a), and the second light irradiator (590b).

In one embodiment, the inspection system (500) may comprise an area camera for the first end surface (561) for capturing the first end surface (551) of the pillar-shaped honeycomb structure (550), and an area camera for the second end surface (562) for capturing the second end surface (552) of the pillar-shaped honeycomb structure (550), which is arranged at a position opposite to the area camera for the first end surface (561).

In one embodiment, the inspection system (500) may comprise a displacement meter (585) for measuring the imaging distance between the side surface (553) of the pillar-shaped honeycomb structure (550) and the area camera for the side surface (530).

In one embodiment, the inspection system (500) may comprise an X stage (532) that can move the area camera (530) in the x direction (horizontal direction), and a Z stage (534) that can move the area camera (530) in the z direction (vertical direction). The x direction may be, for example, a direction parallel to the capturing direction D of the side surface (553) by the area camera for the side surface (530).

The controller (570) is configured to be able to control the operation of each component constituting the inspection system (500). The details of control that can be performed by the controller (570) are exemplified as below.

The controller (570) may be configured to control the operating conditions of the area camera for the side surface (530) (setting of various conditions including the shutter speed of the camera, start and stop of capturing, and the like).

The controller (570) may be configured so that the images obtained as a result of capturing with the area camera for the side surface (530) can be displayed on the screen (540).

The controller (570) may be configured to perform image processing on the images obtained by the area camera (530) and determine the presence or absence of defects based on the result of image processing.

The controller (570) may be configured to control the operation of the entire robot arm (520) including the movement of the robot hand (510), the movement of the pair of gripping surfaces (512a, 512b) including the rotation speed, and the movement of the linear motion mechanism (513). Accordingly, the controller (570) may comprise, for example, an operation program for the robot arm (520); an arithmetic unit composed of a processor such as a microprocessor that performs arithmetic processing for controlling the robot arm (520), a memory, and a storage device; a current amplifier that controls the current that drives the motor; and an interface that exchanges information with peripheral devices.

The controller (570) may be configured to be able to control various operating conditions (ON/OFF, output, or the like) of the light irradiator (590a, 590b, 561, 562).

The controller (570) may be configured to be able to control various operating conditions (ON/OFF, or the like) of the displacement meter (585).

The controller (570) may be configured to be able to control the movement of the X stage (532) in the x direction and the movement of the Z stage (534) in the z direction. The X stage and the Z stage may be independently moved by a driving means such as a motor. Illustratively, the X stage and the Z stage may each be configured by using an electric actuator such as a ROBO cylinder. The electric actuator may be composed of a linear guide, a ball screw, and a servomotor, etc. The servomotor may be equipped with an encoder for detecting the displacement amount of each stage.

The inspection system (500) may comprise an input unit (572) for inputting instructions and/or conditions for performing various controls executed by the controller (570). The input unit (572) may be composed of, for example, a programming pendant, an operation panel, a keyboard, a touch panel, a numeric keypad, a mouse, or the like. The instructions and/or conditions input by the input unit (572) may also be configured to be displayed on the screen (540).

2-2. Step a (Capturing and Image Generation Step)

In one embodiment, the inspection method according to the present invention comprises carrying out a step A of generating a plurality of strip-shaped images by repeatedly capturing the side surface (553) part by part with the area camera for the side surface (530) while relatively moving the area camera for the side surface (530) with respect to the pillar-shaped honeycomb structure (550) so that the area camera for the side surface (530) orbits the side surface (553) of the pillar-shaped honeycomb structure (550).

In the step A, the side surface (553) is repeatedly captured part by part with the area camera for the side surface (530) while relatively moving the area camera for the side surface (530) with respect to the pillar-shaped honeycomb structure (550) so that the area camera for the side surface (530) orbits the side surface (553) of the pillar-shaped honeycomb structure (550). Since the area camera can collectively capture a larger range in the peripheral direction of the pillar-shaped honeycomb structure (550) than a line sensor camera, it is possible to obtain a collectively captured image with a larger range in which blurring is suppressed by increasing the shutter speed. The area camera for the side surface (530) may be either a color camera or a monochrome camera, but a monochrome camera is preferable from the viewpoint of obtaining high pixel resolution.

Relative movement of the area camera for the side surface (530) with respect to the pillar-shaped honeycomb structure (550) so that the area camera for the side surface (530) orbits the side surface (553) of the pillar-shaped honeycomb structure (550) includes the following cases.

A case in which the area camera for the side surface (530) is fixed and the pillar-shaped honeycomb structure (550) is moved so that the area camera for the side surface (530) orbits the side surface (553) of the pillar-shaped honeycomb structure (550).

A case in which the pillar-shaped honeycomb structure (550) is fixed and the area camera for the side surface (530) is moved so that the area camera for the side surface (530) orbits the side surface (553) of the pillar-shaped honeycomb structure (550).

A case in which the area camera for the side surface (530) and the pillar-shaped honeycomb structure (550) are both moved so that the area camera for the side surface (530) orbits the side surface (553) of the pillar-shaped honeycomb structure (550).

The method of relatively moving the area camera for the side surface (530) with respect to the pillar-shaped honeycomb structure (550) so that the area camera for the side surface (530) orbits the side surface (553) of the pillar-shaped honeycomb structure (550) is not limited, but for example, there is a method using the inspection system (500) shown in FIG. 5.

First, the robot arm (520) appropriately drives the base (521), the lower arm (522a), the upper arm (522b), and the robot hand (510) to perform a gripping operation with the pair of gripping surfaces (512a, 512b) from the first end surface (551) and the second end surface (552) of the pillar-shaped honeycomb structure (550) placed at a predetermined position on the setting stand (525). At this time, by instructing the robot hand (510) the position of the center of gravity of one gripping surface (512a) of the pair of gripping surfaces (512a, 512b), the pillar-shaped honeycomb structure (550) can be gripped so that the position of the center of gravity of one gripping surface (512a) of the pair of gripping surfaces (512a, 512b) coincides with the position of the center of gravity of the first end surface (551). The gripping can be performed by shortening the distance between the pair of gripping surfaces (512a, 512b) by the linear motion mechanism (513), and it is also possible to set the gripping force.

By placing the pillar-shaped honeycomb structure (550) on the setting stand (525) so that the cells extend in the horizontal direction, the robot arm (520) can grip the pillar-shaped honeycomb structure (550) from the first end surface (551) and the second end surface (552) by using the pair of gripping surfaces (512a, 512b). At this time, in order to stabilize the position of the pillar-shaped honeycomb structure (550), for example, a block having a U-shaped groove or a V-shaped groove may be provided on the setting stand, and the pillar-shaped honeycomb structure (550) may be placed so that the groove contacts the side surface of the pillar-shaped honeycomb structure (550). In addition, by providing a notch at the top of the table (525) so that the gripping surface (512b) on the lower side of the robot arm (520) can be accessed, the robot arm (520) can grip the pillar-shaped honeycomb structure (550) by using the pair of gripping surfaces (512a, 512b) even if the pillar-shaped honeycomb structure (550) is placed on the setting stand (525) so that the cells extend in the vertical direction.

Next, the robot arm (520) gripping the pillar-shaped honeycomb structure (550) moves the pillar-shaped honeycomb structure (550) to a predetermined inspection position. After that, the inspection system (500) repeatedly captures the pillar-shaped honeycomb structure (550) with the area camera for the side surface (530) while rotating the pair of gripping surfaces (512a, 512b).

The pillar-shaped honeycomb structures (550) industrially manufactured sometimes have a large squareness due to a dimensional error. If the pillar-shaped honeycomb structure (550) has a squareness of 0, when the pillar-shaped honeycomb structure (550) is gripped so that the first end surface (551) is horizontal, the central axis of the pillar-shaped honeycomb structure (550) is oriented in the vertical direction. However, in cases where the pillar-shaped honeycomb structure (550) has a large squareness, when the pillar-shaped honeycomb structure (550) is gripped so that the first end surface (551) is horizontal, the central axis of the pillar-shaped honeycomb structure (550) is oriented in an oblique direction (see FIG. 8A). Therefore, an error occurs in the working distance (WD) between the side surface of the pillar-shaped honeycomb structure (550) near the first end surface (551) and the side surface near the second end surface (552), and out-of-focus parts are likely to occur in the captured images.

Figure 8A:
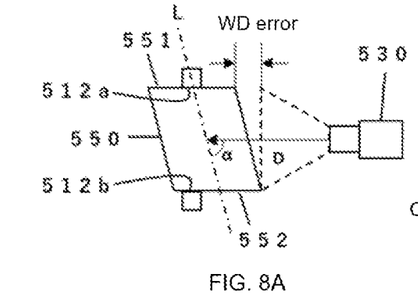
FIG. 8A and FIG. 8B are a schematic view for illustrating a step of adjusting the inclination of a pillar-shaped honeycomb structure having a large squareness.
Figure 8B:
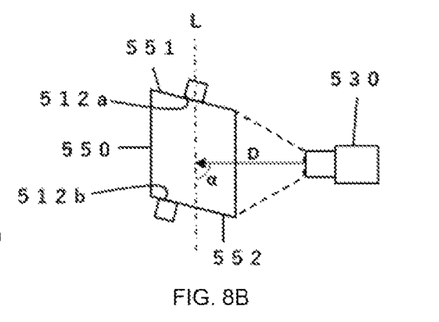

Therefore, before carrying out the step A, it is preferable to carry out a step of measuring the position of the center of gravity of the first end surface (551) and the position of the center of gravity of the second end surface (552) and adjusting inclination of the pillar-shaped honeycomb structure so that a straight line L connecting the position of the center of gravity of the first end surface (551) and the position of the center of gravity of the second end surface (552) approaches perpendicular to the capturing direction D of the area camera for the side surface (530). The inclination of the pillar-shaped honeycomb structure is preferably adjusted so that the angle α formed by the straight line L and the capturing direction D is in the range of 89° to 90° (given that 0° a 90°), and is preferably adjusted so that a is 89.5° to 90°. Further, the inclination of the pillar-shaped honeycomb structure may be controlled based on the error of the working distance (WD). For example, the inclination of the pillar-shaped honeycomb structure can be adjusted so that the maximum error of the working distance (WD) is 0.2 mm or less.

Seeing FIG. 5 again, to carry out the step of adjusting the inclination of the pillar-shaped honeycomb structure (550), in one embodiment, the inspection system (500) further comprises an area camera for the first end surface (561) for capturing the first end surface (551) of the pillar-shaped honeycomb structure (550), and an area camera for the second end surface (562) for capturing the second end surface (552) of the pillar-shaped honeycomb structure (550), which is arranged at a position opposite to the area camera for the first end surface (561). In one embodiment, the inspection system (500) is configured to be able to measure the position of the center of gravity of the first end surface (551) and the position of the center of gravity of the second end surface (552) based on an image of the first end surface (551) captured with the area camera for the first end surface (561) and an image of the second end surface (552) captured with the area camera for the second end surface (562), and to correct a posture of the robot arm (520) while the robot hand (510) gripping the pillar-shaped honeycomb structure (550) so that the straight line connecting the position of the center of gravity of the first end surface (551) and the position of the center of gravity of the second end surface (552) approaches perpendicular to the capturing direction of the area camera for the side surface (530). With this correction, an image with less out-of-focus parts can be obtained. Such correction by the robot arm (520) can be achieved by performing rotation on one or more of the rotation axes (in the illustrated robot arm, S, L, U, R, B, T, W) of the robot arm (520).

Further, when the robot hand (510) grips the pillar-shaped honeycomb structure (550), the gripping position may be deviated. Accordingly, in one embodiment, the inspection system (500) may be configured to correct this deviation. For example, the inspection system (500) is configured to be able to measure a positional deviation in an X-axis direction and a Y-axis direction on the tool coordinates between the center of gravity of the first end surface (551) and the rotation axis of the gripping surface (512a) on the side of the first end surface based on the position of the center of gravity of the first end surface (551) specified by the image of the first end surface (551) captured by the area camera for the first end surface (561) and the position of the rotation axis of the gripping surface (512a) on the side of the first end surface, and to correct the tool coordinate center in the X-axis direction and the Y-axis direction by the amount of the positional deviation with the robot arm (520) based on the measurement result in a state where the robot hand (510) is gripping the pillar-shaped honeycomb structure (550). Such correction by the robot arm (520) can be achieved by performing rotation of one or more of the rotation axes (in the illustrated robot arm, S, L, U, R, B, T, W) of the robot arm (520).

For example, when the arc center (when the end surface shape of the pillar-shaped honeycomb structure is a shape composed of a plurality of different arc components, it is the center of each arc. The tool coordinate center is switched each time the arc to be rotated is switched.) on the first end surface (551) of the pillar-shaped honeycomb structure (550) is set as the tool coordinate center of the robot hand (510), and the pair of gripping surfaces (512a, 512b) are rotated around the arc center as the rotation axis, the tool coordinate center can be corrected by the amount of the positional deviation. Due to this correction, even when the pillar-shaped honeycomb structure (550) is not accurately placed on the setting stand (525) or the gripping position deviates during gripping, an advantage can be obtained that images can be captured with a correct relationship between the imaging distance and the normal direction of the side surface (553) of the pillar-shaped honeycomb structure (550). It is noted, generally, the X-axis direction and the Y-axis direction on the tool coordinates are directions parallel to the pair of gripping surfaces (512a, 512b). Further, the "center of the arc" refers to the center of the circle drawn by the arc.

In the case of a pillar-shaped honeycomb structure whose end surface shape is other than a circular shape, that is, a pillar-shaped honeycomb structure having an end surface shape in which the length of a line segment extending from the center of gravity of the end surface to the outer peripheral contour varies, the orientation of the side surface when starting capturing is also important for improving the inspection accuracy. In one embodiment, the inspection system (500) may be configured to correct the deviation of the orientation of the side surface. For example, the inspection system (500) is configured to measure a deviation of a Z-axis rotation angle on the tool coordinates from the target inspection position of the pillar-shaped honeycomb structure (500) based the image of the first end surface (551) captured by the area camera for the first end surface (561), and to rotate the pillar-shaped honeycomb structure (550) by the amount of the deviation of the angle on the Z-axis with the robot arm (520) based on the measurement result in a state where the robot hand (510) is gripping the pillar-shaped honeycomb structure (550). Such Z-axis rotation by the robot arm (520) can be achieved by performing rotation of one or more of the rotation axes (in the illustrated robot arm, S, L, U, R, B, T, W) of the robot arm (520). It is noted, generally, the rotation axis of Z-axis rotation is equal to the rotation axis W of the pair of gripping surfaces (512a, 512b).

The area camera for the first end surface (561) is preferably provided so that the normal direction of the first end surface (551) is parallel to the capturing direction in order to improve the measurement accuracy. Similarly, the area camera for the second end surface (562) is preferably provided so that the normal direction of the second end surface (552) is parallel to the capturing direction in order to improve the measurement accuracy. The area camera for the first end surface (561) and the area camera for the second end surface (562) are not limited, but for example, an area camera having 2 million to 5 million pixels and a resolution of 0.05 to 0.1 mm/pix can be used. The area camera may be either a color camera or a monochrome camera, but it is sufficient to capture with a monochrome camera.

In order to improve the measurement accuracy, it is preferable that the capturing of the first end surface (551) with the area camera for the first end surface (561) is carried out while irradiating the first end surface (551) with light from the light irradiator (581) provided above the first end surface (551). Further, in order to improve the measurement accuracy, it is preferable that the light from the light irradiator (581) is isotropically applied to the first end surface (551) which is captured by the area camera for the first end surface (561). For example, a method of irradiating light from directly above the first end surface (551) with a ring illumination, a coaxial illumination, or the like as the light irradiator (581) is preferable.

Similarly, in order to improve the measurement accuracy, it is preferable that the capturing of the second end surface (552) with the area camera for the second end surface (562) is carried out while irradiating the second end surface (552) with light from the light irradiator (582) provided below the second end surface (551). Further, in order to improve the measurement accuracy, it is preferable that the light from the light irradiator (582) is isotropically applied to the second end surface (552) which is captured by the area camera for the second end surface (562). For example, a method of irradiating light from directly below the second end surface (552) with a ring illumination, a coaxial illumination, or the like as the light irradiator (582) is preferable.

The light source of the light irradiator (581, 582) is not particularly limited, and examples thereof include an LED, an incandescent light bulb, a halogen lamp and the like. The wavelength of the light to be irradiated is also not particularly limited as long as the area cameras (561, 562) have a light sensitivity to the wavelength. Therefore, it is also possible to irradiate white light. The output of the light to be irradiated is also not particularly limited, but in order to improve the positioning accuracy, the light may be irradiated at an output such that the illuminance of the first end surface (551) and the second end surface (552) is 500 lx or more, preferably 1,000 lx or more.

The capturing direction D by the area camera for the side surface (530) is not limited, but is preferably set to the direction of the normal line N or the vicinity of the direction of the normal line N at a given point on the side surface (553) from the viewpoint of improving the inspection accuracy. For example, the angle between the normal line N of the side surface point located at the center of the imaging range captured by opening and closing the shutter once and the capturing direction D may be 0° to 5°, and is preferably set to 0° to 2°.

In the step A, it is desirable that when relatively moving the area camera for the side surface (530) with respect to the pillar-shaped honeycomb structure (550) so that the area camera for the side surface (530) orbits the side surface (553) of the pillar-shaped honeycomb structure (550), a change in the imaging distance between the side surface (553) and the area camera for the side surface (530) is within ±2 mm, or in other words, it is desirable to relatively move the area camera for the side surface (530) with respect to the pillar-shaped honeycomb structure (550) so that the change in the imaging distance is within 4 mm from the start of capturing to the end of capturing, for the purpose of preventing generation of out-of-focus images. The amount of change in the imaging distance can be monitored using the displacement meter (585).

When the shape of the pillar-shaped honeycomb structure (550) to be inspected is cylindrical, the pillar-shaped honeycomb structure (550) can be rotated around its central axis and captured with a fixed area camera for the side surface (530), and it is easy to suppress the change in imaging distance within the above range. On the other hand, when the shape of the pillar-shaped honeycomb structure to be inspected is other than a cylindrical shape, in order to relatively move the area camera for the side surface (530) with respect to the pillar-shaped honeycomb structure (550) so that the imaging distance falls within the above range, a complicated operation according to the shape of the pillar-shaped honeycomb structure is required.

Accordingly, for example, in the inspection system shown in FIG. 5, there is a method in which operating conditions such as the shape of the pillar-shaped honeycomb structure (550) to be inspected are input in advance from the input unit (572) to teach the area camera for the side surface (530) and the robot arm (520) the movement during the capturing so that the imaging distance falls within a predetermined range. For example, when the end surface shape of the pillar-shaped honeycomb structure (550) is composed of a plurality of different arc components, there is a method comprising setting the robot tool coordinates (center coordinates, radius, start angle, end angle, and the like of each arc component) for each arc component, and changing the posture of the robot arm (520) so that the imaging distance falls within a predetermined range in response to the rotation angle of the pillar-shaped honeycomb structure (550) that rotates while being held by the robot hand (510). Alternatively, instead of the robot arm (520), there is a method of moving the X stage (533) on which the area camera for the side surface (530) is placed in a direction parallel to the capturing direction in response to the rotation angle of the pillar-shaped honeycomb structure that rotates while being held by the robot hand (510).

Further, in the step A, a method of monitoring the imaging distance between the side surface (553) and the area camera for the side surface (530) while the area camera for the side surface (530) orbits the side surface (553) using the displacement meter (585) for measuring the distance, and feedback-controlling the posture of the robot arm (520) or the position of the X stage (533) to keep the distance within a predetermined range, can also be mentioned.

From the viewpoint of detecting the presence or absence of defects with a high accuracy while performing the inspection quickly, it is preferable to set the shutter speed for capturing a part of the side surface (553) when generating one single strip-shaped image with the area camera for the side surface (530) to 10 to 1000 μsec. By increasing the shutter speed, it is possible to obtain an image with less blurring and the inspection speed is also enhanced. Therefore, the upper limit of the shutter speed (exposure time) is preferably 1000 μsec or less, more preferably 100 μsec or less, and even more preferably 50 μsec or less. On the other hand, there is a limit to the increase of the shutter speed, and from the viewpoint of ensuring the brightness required for inspection, the lower limit of the shutter speed (exposure time) is preferably 10 μsec or more, more preferably 20 μsec or more, and even more preferably 40 μsec or more.

When the side surface (553) is repeatedly captured by the area camera for the side surface (530), each strip-shaped image has a longitudinal direction parallel to the height direction (the direction in which cells extend) of the pillar-shaped honeycomb structure (550) and a width direction parallel to the peripheral direction of the pillar-shaped honeycomb structure.

It is preferable that each strip-shaped image has a length covering the entire height of the pillar-shaped honeycomb structure (550) in the longitudinal direction from the viewpoint of quick inspection. If the range of the side surface (553) captured by the area camera (530) at one time covers the entire height of the pillar-shaped honeycomb structure (550), it is possible to generate inspection images of the entire side surface only by rotating the pillar-shaped honeycomb structure (550) once.

From the viewpoint of improving the defect inspection accuracy, each strip-shaped image preferably has a length of 1 to 10 mm in the width direction. As for each strip-shaped image, the shorter the length in the width direction is, the easier it is to obtain an image in focus. Therefore, the length in the width direction is preferably 10 mm or less, more preferably 8 mm or less, and even more preferably 6 mm or less. On the other hand, if the length in the width direction is too short, defects such as cracks extending in the peripheral direction cannot be contained in one image, which may make detection difficult. Therefore, in order to facilitate detection of defects such as cracks extending in the peripheral direction, each strip-shaped image preferably has a length in the width direction of 1 mm or more, more preferably 3 mm or more, and even more preferably 6 mm or more.

When the area camera for the side surface (530) repeatedly captures the side surface (553) part by part, the peripheral speed of the side surface (553) is preferably set so that the inspection image can be quickly inspected while preventing blurring of the inspection image. Although not limited, in the repeated capturing, the average peripheral speed when the area camera for the side surface (530) is relatively moved with respect to the pillar-shaped honeycomb structure (550) so that the area camera for the side surface (530) orbits the side surface (553) of the pillar-shaped honeycomb structure (550) may be set to 50 to 300 mm/sec. If the size of the pillar-shaped honeycomb structure (550) is ordinary, the time required to inspect the entire side surface (335) can be about 5 seconds or less by setting the average peripheral speed in the range. In view of the swiftness of inspection, the lower limit of the average peripheral speed is preferably 50 mm/sec or more, more preferably 100 mm/sec or more, and even more preferably 300 mm/sec or more. On the other hand, if the average peripheral speed is too high, the shutter speed becomes slow with respect to the peripheral speed, and the inspection image tends to be blurred. From this viewpoint, the upper limit of the average peripheral speed is preferably 300 mm/sec or less, more preferably 250 mm/sec or less, and even more preferably 200 mm/sec or less.

The frame rate when the side surface (553) is repeatedly captured part by part by the area camera for the side surface (530) is preferably 100 to 300 Hz, from the viewpoint of capturing the entire side surface (553) of the pillar-shaped honeycomb structure (550) without leakage at a desired peripheral speed for quick inspection. The higher the frame rate is, the more the capturing leakage can be prevented. Therefore, the frame rate is preferably 100 Hz or more, more preferably 200 Hz or more, and even more preferably 300 Hz or more. However, if the frame rate is too high, the price of the camera becomes high and a sufficient field of view cannot be secured in the longitudinal direction of the strip-shaped images. Therefore, the frame rate is preferably 600 Hz or less. Further, considering the accuracy of the operation locus of the robot arm, it is more preferably 400 Hz or less.

In order to detect minute defects with a high accuracy, it is preferable to use a camera having a fine pixel resolution. Specifically, it is preferable to use an area camera having pixel resolutions in the vertical and horizontal directions of the field of view of 50 μm/pix or less (50 μm/pix or finer), respectively. This makes it possible to detect cracks having a crack width of 50 μm or more, which is required for quality inspection, for example. From the viewpoint of enabling detection of cracks having a shorter width (for example, 25 μm or more), the pixel resolution is more preferably μm/pix or less (25 μm/pix or finer). The lower limit of the pixel resolution is not particularly set, but from the viewpoint of easy focusing, it is preferably 15 μm/pix or more (15 μm/pix or coarser), and more preferably 20 μm/pix or more (20 μm/pix or coarser).

From the viewpoint of facilitating the detection of defects, it is preferable that the capturing with the area camera for the side surface (530) is carried out while irradiating the side surface (553) of the pillar-shaped honeycomb structure (550) with light. Specifically, it is desirable to adjust the intensity of the irradiated light so that the illuminance of the side surface (553) of the pillar-shaped honeycomb structure (550) is 10,000 lx or more, preferably 100,000 lx or more, and more preferably 500,000 lx or more. There is no particular upper limit to the illuminance of the side surface (553) of the pillar-shaped honeycomb structure (550) irradiated with the irradiation light, but from the viewpoint of economy, the illuminance of the side surface (553) of the pillar-shaped honeycomb structure (550) is preferably 1 million lx or less.

As long as the area camera for the side surface (530) has light sensitivity, the wavelength of the light irradiated to the side surface (553) of the pillar-shaped honeycomb structure (550) is not particularly limited, but for example, light of 350 to 800 nm may be irradiated. It is also possible to irradiate white light. The light source of the light irradiator (590a, 590b) for the side surface that the inspection system (500) has is not particularly limited, and examples thereof include an LED, an incandescent light bulb, a halogen lamp and the like.

When the side surface (553) of the pillar-shaped honeycomb structure (550) is captured by the area camera for the side surface (530), the range that can be captured by opening and closing the shutter once is an elongated range extending linearly in the height direction of the pillar-shaped honeycomb structure (550). Therefore, it is preferable to use line illumination for the light irradiator (590a, 590b) because it is efficient in increasing the illuminance. Specifically, it is preferable that the light irradiated to the side surface (553) of the pillar-shaped honeycomb structure (550) is irradiated by a line illumination whose longitudinal direction extends in a direction parallel to the height direction of the pillar-shaped honeycomb structure (550). Further, for the line illumination, it is preferable to set the irradiation direction of the light so as to illuminate the imaging range of the area camera for the side surface (530).

In case of irradiating light, it is preferable to repeatedly and stroboscopically capture the side surface (553) part by part with the area camera for the side surface (530) while alternately irradiating the side surface (553) with a first light and a second light from different directions interposing the area camera for the side surface (530) (see FIG. 6). As a result, strip-shaped images with different light irradiation directions are alternately generated, so it becomes easy to detect stepped cracks generated by deviation of a part of the side surface (553) in the radial direction along the height direction (direction in which the cells extend) of the pillar-shaped honeycomb structure (550). This is because the stepped cracks may or may not generate shadow depending on the light irradiation direction, and the shadow make it easier to detect the cracks.

When performing the stroboscopic capture, the controller (570) transmits a trigger signal for giving a command to open the shutter at a predetermined frame rate to the area camera for the side surface (530). Further, the controller (570) alternately transmits trigger signals for giving a light irradiation command to each of the pair of light irradiators (590a, 590b) at the timing of opening of the shutter of the area camera for the side surface (530). For example, the stroboscopic capture may be performed with the frame rate of the area camera for the side surface (530) set to 300 Hz and the irradiation frequency of each light irradiator (590a, 590b) set to 150 Hz.

As shown in FIG. 6, it is preferable to arrange one or more pairs of the light irradiators (590a, 590b) at symmetrical positions (typically, left and right positions) with respect to the center of the imaging range when the side surface (553) of the pillar-shaped honeycomb structure (550) is captured by the area camera for the side surface (530). That is, it is preferable that each pair of the light irradiators (590a, 590b) is arranged symmetrically with respect to the normal line N of the side surface (553) so that the irradiation angles $\theta_1$ and $\theta_2$ (the angle of the center of the optical axis of the illumination light with respect to the normal line N of the side surface point located in the center of the imaging range) are at the same angle ($\theta_1=\theta_2$) or close to each other ($|\theta_1-\theta_2|=0°$ to 10°). The irradiation angles $\theta_1$ and $\theta_2$ are not limited, but can be, for example, in the range of 5° to 30°. Further, it is preferable that each pair of light irradiators (590a, 590b) has a similar irradiation distance and light intensity (Example: the ratio of the irradiation distance of one light irradiator to the irradiation distance of the other light irradiator constituting the pair is 0.9 to 1.1, and the ratio of the light intensity of one light irradiator to the light intensity of the other light irradiator constituting the pair is 0.9 to 1.1).

It is preferable that the repeated capturing in the step A is carried out so that each of the strip-shaped images has a portion overlapping in the peripheral direction of the side surface of the pillar-shaped honeycomb structure with the strip-shaped image of the same light irradiation direction at a last capturing time and with the strip-shaped image of the same light irradiation direction at a next capturing time. Specifically, it is preferable that the portion overlapping in the peripheral direction is 3 mm or more. This is because it is desirable that defects such as cracks extending by 3 mm or more in the peripheral direction can be detected in terms of the quality of the pillar-shaped honeycomb structure. The portion overlapping in the peripheral direction may be 4 mm or more, and may be 5 mm or more. However, if the portion overlapping in the peripheral direction is too long, it hinders quick inspection. Therefore, it is sufficient to set the overlapping portion in the peripheral direction in the range of 3 to 5 mm.

Figure 7A:
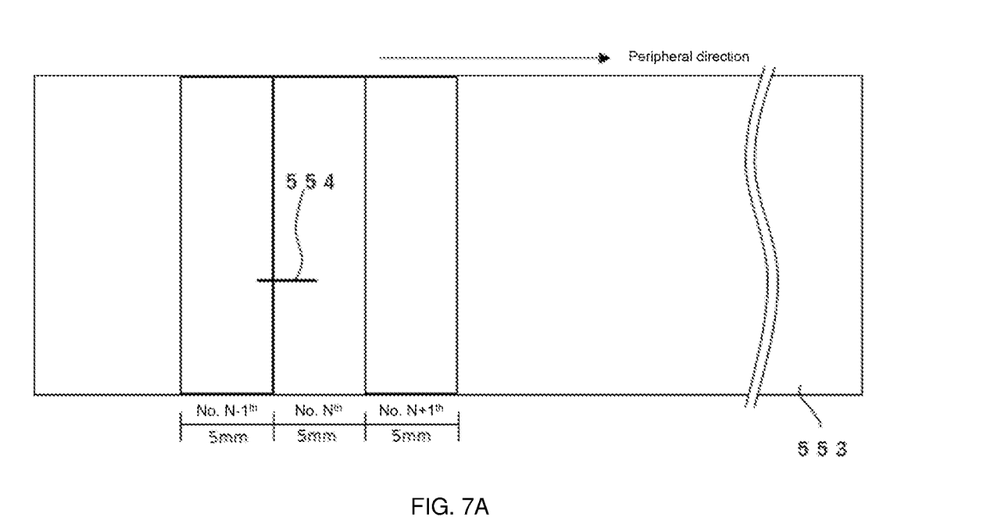
FIG. 7A is a schematic view on a developed view of the side surface showing the imaging ranges of the No. N–1$^{th}$, N$^{th}$, and N+1$^{th}$ strip-shaped images when the side surface of the pillar-shaped honeycomb structure is repeatedly captured with the length of the strip-shaped image in the peripheral direction (width direction) being 5 mm and no overlapping portion in the peripheral direction without changing the light irradiation direction.

FIG. 7A is a schematic view on a developed view of the side surface (553) showing the imaging ranges of the No. N−1th, $N^{th}$, and N+$1^{th}$ strip-shaped images when the side surface (553) is repeatedly captured with the length of the strip-shaped image in the peripheral direction (width direction) being 5 mm and no overlapping portion in the peripheral direction without changing the light irradiation direction. In this example, the side surface (553) moves in the peripheral direction by 5 mm while capturing the No. N−$1^{th}$ imaging range, and the side surface (553) moves in the peripheral direction by 5 mm while capturing the No. $N^{th}$ imaging range, and the side surface (553) moves in the peripheral direction by 5 mm while capturing the No. N+$1^{th}$ imaging range.

Figure 7B:
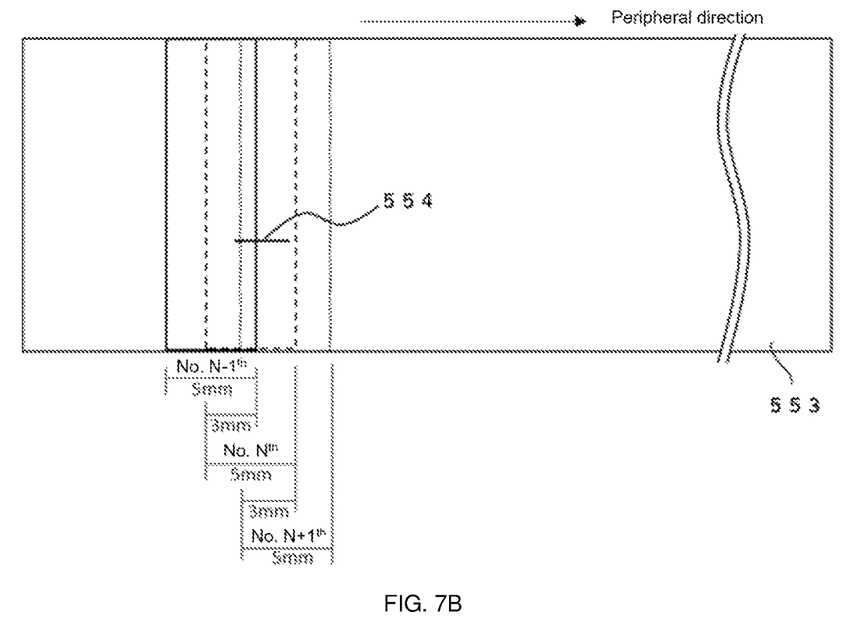
FIG. 7B is a schematic view on a developed view of the side surface showing the imaging ranges of the No. N–1$^{th}$, N$^{th}$, and N+1$^{th}$ strip-shaped images when the side surface of the pillar-shaped honeycomb structure is repeatedly captured with the length of the strip-shaped image in the peripheral direction (width direction) being 5 mm and the overlapping portion in the peripheral direction being 3 mm without changing the light irradiation direction.

FIG. 7B is a schematic view on a developed view of the side surface (553) showing the imaging ranges of the No. N−$1^{th}$, $N^{th}$, and N+$1^{th}$ strip-shaped images when the side surface (553) is repeatedly captured with the length of the strip-shaped image in the peripheral direction (width direction) being 5 mm and the overlapping portion in the peripheral direction being 3 mm without changing the light irradiation direction. In this example, the side surface (553) moves in the peripheral direction by 2 mm while capturing the No. N−$1^{th}$ imaging range, and the side surface (553) moves in the peripheral direction by 2 mm while capturing the No. $N^{th}$ imaging range, and the side surface (553) moves in the peripheral direction by 2 mm while capturing the No. N+$1^{th}$ imaging range.

Figure 7C:
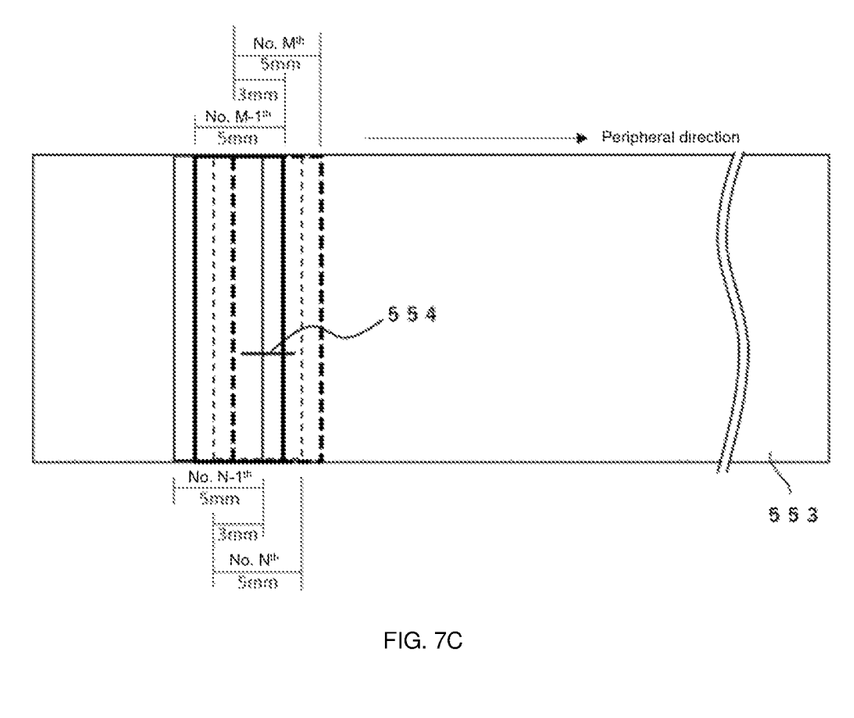
FIG. 7C is a schematic view on a developed view of the side surface showing the imaging ranges of the No. N–1$^{th}$ and N$^{th}$ strip-shaped images captured while irradiating with the first light and the imaging ranges of the No. M–1$^{th}$ and M$^{th}$ strip-shaped images captured while irradiating with the second light when the side surface of the pillar-shaped honeycomb structure is repeatedly captured with the length of the strip-shaped image in the peripheral direction (width direction) being 5 mm and the overlapping portion in the peripheral direction with the strip-shaped image of the same light irradiation direction being 3 mm while alternately switching the light irradiation direction.

FIG. 7C is a schematic view on a developed view of the side surface (553) showing the imaging ranges of the No. N−$1^{th}$ and $N^{th}$ strip-shaped images captured while irradiating with the first light and the imaging ranges of the No. M−$1^{th}$ and $M^{th}$ strip-shaped images captured while irradiating with the second light when the side surface (553) is repeatedly captured with the length of the strip-shaped image in the peripheral direction (width direction) being 5 mm and the overlapping portion in the peripheral direction with the strip-shaped image of the same light irradiation direction being 3 mm while alternately switching the light irradiation direction. In this example, the side surface (553) moves in the peripheral direction by 1 mm while capturing the imaging range of the No. N−$1^{th}$ image while irradiating with the first light, and the side surface (553) moves in the peripheral direction by 1 mm while capturing the imaging range of the No. M−$1^{th}$ image while irradiating with the second light, and the side surface (553) moves in the peripheral direction by 1 mm while capturing the imaging range of the No. $N^{th}$ image while irradiating with the first light, and the side surface (553) moves in the peripheral direction by 1 mm while capturing the imaging range of the No. $M^{th}$ image while irradiating with the second light.

In the examples shown in FIGS. 7A, 7B, and 7C above, a crack having a length of 3 mm or more in the peripheral direction is to be detected as a defect.

In the case of the example shown in FIG. 7A, if there is a crack (554) having a length of 3 mm in the peripheral direction partially captured in the No. N−$1^{th}$ strip-shaped image, the crack (554) is only partially captured in the No. $N^{th}$ strip-shaped image, too. Therefore, since the length of the crack (554) in each strip-shaped image is less than 3 mm, the crack (554) cannot be detected as a defect when inspecting each of the strip-shaped images.

In the case of the example shown in FIG. 7B, if there is a crack (554) having a length of 3 mm in the peripheral direction partially captured in the No. N-1$^{th}$ strip-shaped image, the crack (554) cannot be detected as a defect in the No. N-1$^{th}$ strip-shaped image. However, since the No. N$^{th}$ strip-shaped image has a portion of 3 mm overlapping with the No. N-1$^{th}$ strip-shaped image in the peripheral direction, the crack (554) can be detected as a defect in the No. N$^{th}$ strip-shaped image.

In the case of the example shown in FIG. 7C, if there is a crack (554) having a length of 3 mm in the peripheral direction partially captured in the No. N-1$^{th}$ strip-shaped image, the crack (554) cannot be detected as a defect in the No. N-1$^{th}$ strip-shaped image. However, since the No. N$^{th}$ strip-shaped image has a portion of 3 mm overlapping with the No. N-1$^{th}$ strip-shaped image in the peripheral direction, the crack (554) can be detected as a defect in the No. N$^{th}$ strip-shaped image. Similarly, if there is a crack (554) having a length of 3 mm in the peripheral direction partially captured in the No. M-1$^{th}$ strip-shaped image, the crack (554) cannot be detected as a defect in the No. M-1$^{th}$ strip-shaped image. However, since the No. M$^{th}$ strip-shaped image has a portion of 3 mm overlapping with the No. M-1$^{th}$ strip-shaped image in the peripheral direction, the crack (554) can be detected as a defect in the No. M$^{th}$ strip-shaped image.

The data of the strip-shaped images generated as a result of repeated capturing by the area camera for the side surface (530) can be stored in a storage in the controller (570) in association with the position data of the parts of the side surface (553) where the strip-shaped images were captured. For example, when capturing by the area camera for the side surface (530) is started and the pair of gripping surfaces (512a, 512b) starts to rotate, the encoder mounted on the chuck (512) emits pulses (encoder pulses) at predetermined time intervals. The encoder pulse is passed to the controller (570). The controller (570) gives a capturing instruction to the area camera for the side surface (530) to execute capturing in synchronization with the timing of receiving the encoder pulse. By carrying out the capturing at the timing when the encoder pulse is emitted in this way, it is possible to generate a data set of image data at the time of individual capturing and the pulse value of the encoder pulse. Since it is possible to specify the position of the part of the side surface (553) corresponding to the image data based on the pulse value, it is possible to associate the image data with the position data.

Further, the strip-shaped images generated as a result of repeated capturing by the area camera for the side surface (530) can be configured to be displayed on the screen (540) of a display device such as an LCD or an organic EL display. To the strip-shaped image, image processing such as filter processing may be executed as necessary in order to facilitate the determination of defects in the next step. Examples of the filter processing include binarization processing, shading correction, contraction/expansion processing, and the like. Image processing can be configured to be performed by the controller (570).

It is desirable that the number of the strip-shaped images generated in step A be sufficient to cover the entire side surface of the pillar-shaped honeycomb structure, but the image data obtained by capturing one round of the pillar-shaped honeycomb structure with the area camera has a large volume. Therefore, if the image processing is performed after the capturing process is completed, the image processing takes time and the inspection speed is lowered. Therefore, each time a strip-shaped image is generated, image processing may be executed in parallel with the capturing process.

2-3. Step B (Defect Determination Step)

In one embodiment, the inspection method according to the present invention comprises carrying out a step B of determining presence or absence of defects on the side surface (553) based on the strip-shaped images obtained in the step A. The step of determining the presence or absence of defects may be visually performed by an inspector, but since the number of strip-shaped images generated is enormous, it is preferable to have the controller (570) conduct the determination based on a preset criterion. In one embodiment, the step of determining the presence or absence of defects on the side surface (553) based on the strip-shaped images includes determining the presence or absence of cracks having a width of μm or more. Here, the width of a crack refers to the maximum value of the length in the direction orthogonal to the longitudinal direction of the crack.

When determining the presence or absence of cracks having a width of 25 μm or more by the controller (570), for example, a method of binarizing each strip-shaped image so that the part with defects such as cracks can be distinguished from the other parts, and determining the presence or absence cracks having a width of μm or more using the inspection image after the binarization, can be mentioned.

DESCRIPTION OF REFERENCE NUMERALS

100 Pillar-shaped honeycomb structure
102 Outer peripheral wall
103 Side surface
104 First end surface
106 Second end surface
108 Cell
112 Partition wall
200 Pillar-shaped honeycomb structure
202 Outer peripheral wall
203 Side surface
204 First end surface
206 Second end surface
208a First cell
208b Second cell
212 Partition wall
500 Inspection system
510 Robot hand
512 Chuck
512a, 512b Gripping surface
513 Linear motion mechanism
520 Robot arm
521 Base
522a Lower arm
522b Upper arm
523 Pedestal
525 Setting stand
530 Area camera for the side surface
532 X stage
534 Z stage
540 Screen
550 Pillar-shaped honeycomb structure
551 First end surface
552 Second end surface
553 Side surface
561 Area camera for first end surface
562 Area camera for second end surface
570 Controller
572 Input unit
581 Light irradiator
582 Light irradiator 585 Displacement meter
590a First light irradiator
590b Second light irradiator

The invention claimed is:

1. An inspection system for carrying out an inspection method for a pillar-shaped honeycomb structure, the inspection system comprising:
a robot arm with a robot hand at a tip of the robot arm, the robot hand comprising a pair of flat gripping surfaces directly opposed from each other capable of gripping the pillar-shaped honeycomb structure from a first end surface and a second end surface, the pair of flat gripping surfaces being configured to be able to rotate the pillar-shaped honeycomb structure around a rotation axis perpendicular to the pair of flat gripping surfaces at a predetermined rotational speed while gripping the pillar-shaped honeycomb structure from the first end surface and the second end surface;
an area camera for a side surface;
a screen that can display strip-shaped images; and
a controller that can at least set a rotation speed of the pair of flat gripping surfaces and a shutter speed of the area camera for the side surface.

2. The inspection system according to claim 1, comprising a first light irradiator for irradiating the side surface with the first light and a second light irradiator for irradiating the side surface with the second light from a direction different from the first light with the area camera for the side surface interposed therebetween.

3. The inspection system according to claim 1, comprising a displacement meter for measuring an imaging distance, which is a distance in a capturing direction between the side surface and the area camera for the side surface, wherein the displacement meter is configured to be able to monitor an amount of change in the distance while the area camera for the side surface orbits the side surface of the pillar-shaped honeycomb structure.

4. The inspection system according to claim 1, further comprising an area camera for the first end surface for capturing the first end surface, and an area camera for the second end surface for capturing the second end surface which is arranged at a position opposite to the area camera for the first end surface,
wherein the inspection system is configured to be able to measure a position of a center of gravity of the first end surface and a position of a center of gravity of the second end surface based on an image of the first end surface captured with the area camera for the first end surface and an image of the second end surface captured with the area camera for the second end surface, and to correct a posture of the robot arm in a state where the robot hand is gripping the pillar-shaped honeycomb structure so that the straight line connecting the position of the center of gravity of the first end surface and the position of the center of gravity of the second end surface approaches perpendicular to the capturing direction of the area camera for the side surface more than before correcting the posture of the robot arm.

5. The inspection system according to claim 1, further comprising an area camera for the first end surface for capturing the first end surface,
wherein the inspection system is configured to be able to measure a positional deviation in an X-axis direction and a Y-axis direction on tool coordinates between a center of gravity of the first end surface and a rotation axis of the gripping surface on a side of the first end surface based on a position of the center of gravity of the first end surface specified by an image of the first end surface captured by the area camera for the first end surface and a position of the rotation axis of the gripping surface on the side of the first end surface, and to correct a tool coordinate center in the X-axis direction and the Y-axis direction by an amount of the positional deviation with the robot arm based on a measurement result in a state where the robot hand is gripping the pillar-shaped honeycomb structure.

6. The inspection system according to claim 1, further comprising an area camera for the first end surface for capturing the first end surface,
wherein the inspection system is configured to be able to measure a deviation of a Z-axis rotation angle on tool coordinates from a target inspection position of the pillar-shaped honeycomb structure based an image of the first end surface captured by the area camera for the first end surface, and to rotate the pillar-shaped honeycomb structure by an amount of the deviation of the angle on the Z-axis with the robot arm based on a measurement result in a state where the robot hand is gripping the pillar-shaped honeycomb structure.

* * * * *